United States Patent
Nakawatase

[11] Patent Number: 6,008,622
[45] Date of Patent: Dec. 28, 1999

[54] NON-CONTACT BATTERY CHARGING EQUIPMENT USING A SOFT MAGNETIC PLATE

[75] Inventor: Norio Nakawatase, Yokohama, Japan

[73] Assignee: NEC Moli Energy Corp., Yokohama, Japan

[21] Appl. No.: 09/161,439

[22] Filed: Sep. 28, 1998

[30]     Foreign Application Priority Data

Sep. 29, 1997  [JP]  Japan .................................. 9-264376

[51] Int. Cl.⁶ ........................................................ H02J 7/00
[52] U.S. Cl. ............................................................. 320/108
[58] Field of Search ............................................. 320/108

[56]         References Cited

U.S. PATENT DOCUMENTS 5,600,222  2/1997  Hall et al. ................................. 320/108
  5,654,621  8/1997  Seelig ...................................... 320/108
  5,661,391  8/1997  Ito et al. .................................. 320/108

FOREIGN PATENT DOCUMENTS 7-231586   8/1995  Japan .

*Primary Examiner*—Peter S. Wong
*Assistant Examiner*—Gregory J. Toatley, Jr.
*Attorney, Agent, or Firm*—Armstrong, Westerman, Hattori, McLeland & Naughton

[57]         ABSTRACT

The invention provides a non-contact charging equipment having high transmission efficiency and used to supply electric power on non-contact basis by electromagnetic induction, whereby it comprises a plurality of coils on a planar magnetically soft material on each of power transmitting and power receiving sides, whereby the coils on the power transmitting side and the power receiving side are arranged at opposed positions and with a spacing so that magnetic fluxes generated by adjacent coils are directed in reverse directions, the magnetically soft material in planar shape on the power receiving side is arranged directly or via an insulating member on a battery can, and heat generated on the power receiving side is radiated by the battery can.

7 Claims, 1 Drawing Sheet

NON-CONTACT BATTERY CHARGING EQUIPMENT USING A SOFT MAGNETIC PLATE

BACKGROUND OF THE INVENTION

The present invention relates to a non-contact charging equipment for transmitting electric power from a charger to a battery on non-contact basis by electromagnetic induction, and in particular to a non-contact charging equipment for efficiently transmitting electric power.

Charging to a secondary battery to be used as power source for portable devices has been generally performed by transmitting electric power through conductive contact between metallic contact and contact of a charger on a battery pack or on a battery pack mounted on a device.

However, there have been problems in that poor conductive contact occurs or charging cannot be achieved due to oxidation of the metal of the contact or due to attachment of dust or oil, and abnormal heating occurs at the contact. Also, accidents are sometimes caused by electrostatic destruction of electronic components inside the device due to contact of metal contact with human body or other electrically charged object.

Further, there have been problems such as complicated structure of the equipment because waterproof construction must be adopted when conductive contact is provided on the surface of the equipment.

To solve the above problems, there has been proposed a method to supply electric power from the transmitting side to the receiving side using electromagnetic induction between coils provided on both the power transmitting side and the power receiving side, thus without replying on conductive connection through contacts.

In a transmission equipment of charging current using electromagnetic induction, coils wound on a core such as ferrite core have been used. However, transmission efficiency is lower despite of large volume and heavy weight of the equipment, and output is about 2 W and there is also problem of heating.

To overcome these problems, an equipment having high transmission efficiency combining a magnetically soft material and a flat-faced spiral coil has been proposed instead of the coil wound on ferrite core, and this is described as a cordless power station in JP-A-7-231586.

However, even in this type of equipment, battery is sometimes arranged away from the coil on the power receiving side, and the measures to prevent excessive heating caused by coil have also been not very satisfactory.

In particular, it is generally practiced to use metal such as iron or its alloy as a battery can, and it is necessary to arrange the battery away from magnetic line of force for receiving electric power. Specifically, when it is desired to increase electric power for charging, magnetic force on the power transmitting side is also increased. As a result, large space is required on the side of the portable device, and it is considered as difficult to arrange it in a battery pack.

It is an object of the present invention to provide a non-contact charging equipment for supplying electric power from power transmitting side to power receiving side on non-contact basis by electromagnetic induction, by which it is possible to transmit and receive electric power efficiently and to suppress heating, and also to provide an equipment where the equipment on the power receiving side is arranged in a battery pack.

SUMMARY OF THE INVENTION

The non-contact charging equipment for supplying electric power on non-contact basis by electromagnetic induction of the present invention comprises a plurality of coils on a planar magnetically soft material on each of power transmitting and power receiving sides, whereby the coils on the power transmitting side and the power receiving side are arranged at opposed positions and with a spacing so that magnetic fluxes generated by adjacent coils are directed in reverse directions, the magnetically soft material in planar shape on the power receiving side is arranged directly or via an insulating member on a battery can, and heat generated on the power receiving side is radiated by the battery can.

The invention also provides the non-contact charging equipment as described above, wherein it is provided in a battery pack.

The invention further provides the non-contact charging equipment as described above, wherein the magnetically soft material is a magnetically soft ferrite plate.

The invention further provides the non-contact charging equipment as described above, wherein thickness of the magnetically soft ferrite plate on the power receiving side is 0.1 to 5.0 mm.

Also, the invention provides the non-contact charging equipment as described above, wherein the battery to be charged is a lithium ion battery.

DESCRIPTION OF THE PREFERRED EMBODIMENTS

According to the present invention, in a charging equipment for transmitting electric power on non-contact basis by electromagnetic induction, coils are provided in contact with a magnetically soft material, and this makes it possible to transmit electric power at high efficiency. Also, the magnetically soft material is arranged directly or via an insulating member on a battery can, and this gives an effect to suppress excessive heating because heat generated from the power receiving side is radiated from the battery can thermally connected.

In the following, description will be given on the present invention referring to the attached drawings.

Figure 1:
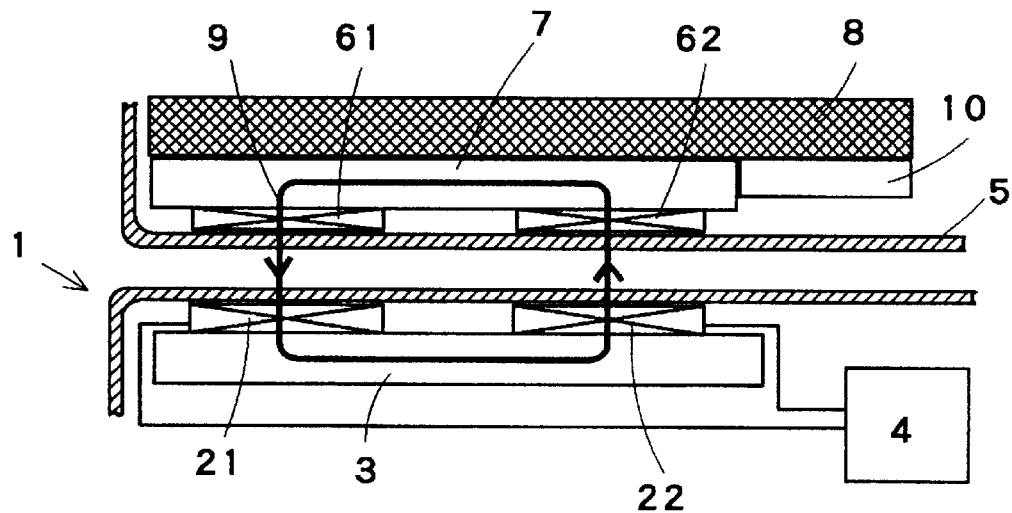
FIG. 1 is a drawing to explain an example of a noncontact charging equipment according to the present invention.

FIG. 1 is a drawing to explain an example of a noncontact charging equipment according to the present invention.

On the power transmitting side of the charging equipment, power transmitting coils 21 and 22 are arranged on a magnetically soft ferrite plate 3 in such manner that magnetic fluxes of the coils are directed in reverse directions and aligned electrically in series and also at such positions that the magnetic fluxes exert influence on each other. High frequency current is supplied from a charging power source 4.

On a battery pack 5, power receiving coils 61 and 62 are arranged at opposite positions to the power transmitting coils in such manner that the magnetic fluxes are directed in reverse directions. The coils are mounted on a magnetically soft ferrite plate 7, and the magnetically soft ferrite plate 7 is directly mounted on a battery can 8. The battery can 8 may be mounted on the magnetically soft ferrite plate 7 via an insulating member, but it is preferably connected directly in order to reduce thermal resistance caused by contact.

In particular, in a lithium ion battery, heating during charging is very low, and battery can can be used for heat radiation. Because the magnetic flux generated on the power transmitting coils passes through the magnetically soft ferrite plates 3 and 7, leakage to outside is low, and high transmission efficiency can be achieved.

Electric current received by the power receiving coils is rectified by a charge control means 10 including rectifier, and it is regulated to such electric current and voltage as desired and is supplied to the battery. The charge control means 10 can also be arranged in contact with wall surface of the battery can for heat radiation.

In the present invention, it is preferable that the power transmitting coils and the power receiving coils are designed as flat-faced spiral coils by connecting two or more flat-faced spiral coils and arranged in two or more of opposing sets. If adjacent magnetic fluxes are directed in reverse directions in each set and are arranged at adjacent positions, amount of magnetic fluxes increases. This results in reinforcement of the magnetic fluxes with each other and reduces leaking magnetic fluxes to outside, and influence on the surrounding device and equipment can be decreased. When the flat-faced spiral coils are arranged closely to each other with the above arrangement, in addition to mutual inductance between primary and secondary sides, mutual inductance between the adjacent coils effectively exerts action, and this leads to the improvement of transmitted electric power and conversion efficiency.

In particular, by mounting the magnetically soft material on outer side of coils on the power transmitting side and the power receiving side, the magnetic fluxes generated at coils are concentrated and pass through the magnetically soft material. As a result, leaking fluxes can be decreased. If a resonance capacitor is inserted into the power receiving coils in parallel, it is possible to further improve the conversion efficiency.

As the magnetically soft material to be used in the present invention, Ni—Cu—Zn ferrite, Ni—Cu—Zn ferrite, or Mn—Zn ferrite may be used, or Mn ferrite, Mg ferrite, Ni ferrite, Cu ferrite, Li ferrite, Co ferrite, etc. may be used. Further, a part of it may be replaced with ZnO, or an additive may be added, or these substances may be mixed together and used.

It is preferable that the planar magnetically soft material of the present invention has thickness of 0.1 to 5 mm. When the magnetically soft ferrite plate has thickness of 0.1 mm or more, an effect to catch magnetic fluxes is increased. When it has thickness of 5.0 mm or more, it is not possible to have a thin type equipment. In the non-contact charging equipment of the present invention, it is preferable to use high frequency current of 50 to 500 kHz. If it is lower than 50 kHz, problems such as noise caused by audio frequency may arise. If it is more than 500 kHz, problems such as electromagnetic interference (EMI) may occur, and this is not desirable.

In the following, description will be given on embodiments of the present invention.

EXAMPLE 1

A copper wire with insulating film formed on it and having diameter of 0.45 mm was wound by 16 turns, and two spiral coils each of 16 mm in outer diameter and 5 mm in inner diameter were prepared, and these were connected in series. Distance between coil centers was set to 18.5 mm and the coils were mounted on a magnetically soft Mn—Zn ferrite plate of 19×38×1.0 mm (length×width×thickness) so that magnetic fluxes were generated in reverse directions, and a power transmitting coil unit was prepared.

Also, a copper wire with insulating film formed on it and having diameter of 0.3 mm was wound by 16 turns, and two spiral coils of 16 mm in outer diameter and 5 mm in inner diameter were prepared, and these were connected in series. Distance between coil centers was set to 18.5 mm and the coils were mounted on a magnetically soft Mn—Zn ferrite plate of 19×38×0.5 mm (length×width×thickness) so that magnetic fluxes were generated in reverse directions, and a power receiving coil unit was prepared.

The surface of the magnetically soft ferrite plate of the power receiving coil unit opposite to the side mounted with the coil was attached to outer wall of rectangular type lithium battery, and this was mounted in a battery pack of 0.5 mm in thickness. The distance between the power transmitting coil and the power receiving coil was set to 3 mm, and electric current of 100 kHz was supplied to the power transmitting coil. A circuit board comprising resonance capacitor, rectifier, capacitor, and charge control circuit integrally arranged together was mounted on wall surface of the battery can of the lithium battery, and the battery was charged, and electric current and voltage supplied to the lithium battery were determined.

Figure 2:
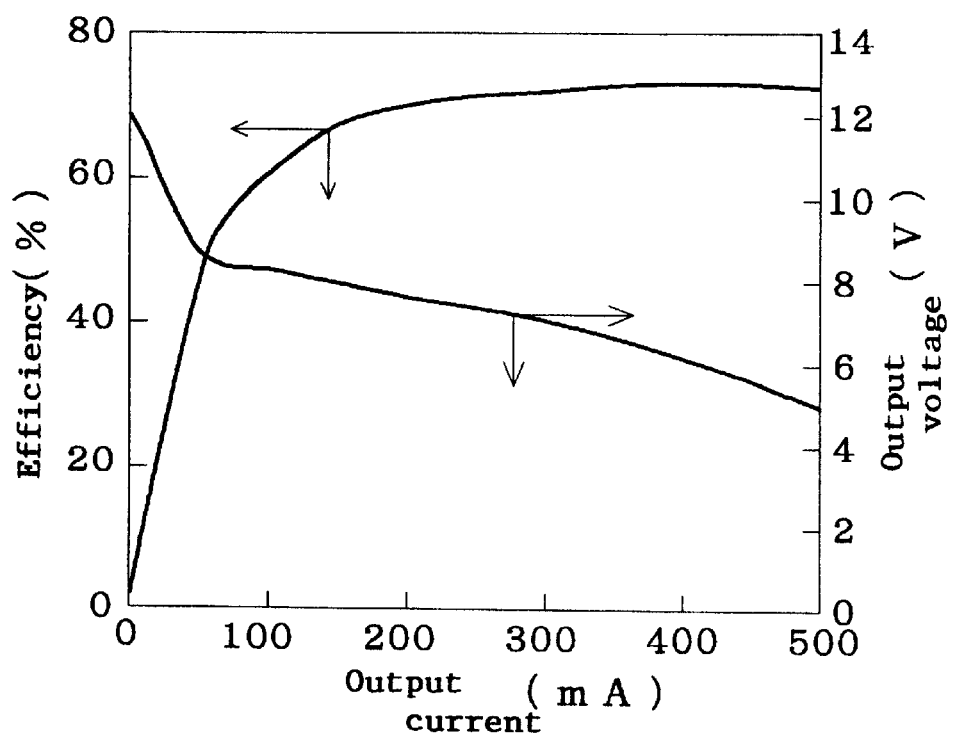
FIG. 2 is a diagram showing relationship between transmission efficiency and output voltage of the noncontact charging equipment of the present invention.

Ratio of charging current and charging voltage to electric power supplied to the transmitting coil was regarded as efficiency, and this is shown in FIG. 2 together with charging current and charging voltage.

In the non-contact charging equipment of the present invention, magnetic flux leakage is prevented by the magnetically soft material mounted on outer side of the coil. Because the magnetically soft material mounted with the power receiving coil can be arranged in direct contact with the battery can, it is possible to place the power receiving coil unit in the battery pack, and heat generated at the power receiving coil can be radiated by the battery can, and this makes it possible to charge strong electric current within short time.

What I claim is:

1. A non-contact charging equipment for supplying electric power on non-contact basis by electromagnetic induction, comprising a plurality of coils on a planar magnetically soft material on each of power transmitting and power receiving sides, whereby the coils on the power transmitting side and the power receiving side are arranged at opposed positions and with a spacing so that magnetic fluxes generated by adjacent coils are directed in reverse directions, the magnetically soft material in planar shape on the power receiving side is arranged directly or via an insulating member on a battery can, and heat generated on the power receiving side is radiated by the battery can.

2. A non-contact charging equipment according to claim 1, wherein said equipment is arranged in a battery pack.

3. A non-contact charging equipment according to claim 1, wherein said magnetically soft material is a magnetically soft ferrite plate.

4. A non-contact charging equipment according to claim 2, wherein said magnetically soft material is a magnetically soft ferrite plate.

5. A non-contact charging equipment according to claim 3, wherein thickness of the magnetically soft ferrite plate on the power receiving side is 0.1 to 5.0 mm.

6. A non-contact charging equipment according to claim 4, wherein thickness of the magnetically soft ferrite plate on the power receiving side is 0.1 to 5.0 mm.

7. A non-contact charging equipment according to claim 1, wherein the battery to be charged is a lithium ion battery.

* * * * *